United States Patent

Luo et al.

(10) Patent No.: US 10,554,375 B2
(45) Date of Patent: Feb. 4, 2020

(54) FULL DUPLEX DEVICE-TO-DEVICE COOPERATIVE COMMUNICATION

(71) Applicant: MICRON TECHNOLOGY, INC., Boise, ID (US)

(72) Inventors: Fa-Long Luo, San Jose, CA (US); Tamara Schmitz, Scotts Valley, CA (US); Jeremy Chritz, Seattle, WA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/701,007

(22) Filed: Sep. 11, 2017

(65) Prior Publication Data

US 2019/0081766 A1 Mar. 14, 2019

(51) Int. Cl.
| | |
|---|---|
| H04L 5/14 | (2006.01) |
| H04B 1/525 | (2015.01) |
| H04B 7/06 | (2006.01) |
| H04W 4/70 | (2018.01) |
| H04B 7/026 | (2017.01) |
| H04B 7/08 | (2006.01) |

(Continued)

(52) U.S. Cl.
CPC .............. *H04L 5/14* (2013.01); *H04B 1/525* (2013.01); *H04B 7/026* (2013.01); *H04B 7/0623* (2013.01); *H04B 7/0854* (2013.01); *H04W 4/40* (2018.02); *H04W 4/70* (2018.02); *H04L 5/001* (2013.01); *H04L 25/02* (2013.01); *H04W 76/14* (2018.02)

(58) Field of Classification Search
CPC .............. H04L 5/14; H04W 4/70; H04B 1/525
See application file for complete search history.

(56) References Cited

U.S. PATENT DOCUMENTS

| | | |
|---|---|---|
| 5,377,108 A | 12/1994 | Nishio |
| 9,147,353 B1 | 9/2015 | Slusar |

(Continued)

FOREIGN PATENT DOCUMENTS

| | | |
|---|---|---|
| CN | 104468055 A | 3/2015 |
| CN | 104539341 A | 4/2015 |

(Continued)

OTHER PUBLICATIONS

U.S. Appl. No. 16/114,923 titled "Cooperative Learning Neural Networks and Systems" filed Aug. 28, 2018, pp. all.

(Continued)

*Primary Examiner* — Rebecca E Song
(74) *Attorney, Agent, or Firm* — Dorsey & Whitney LLP

(57) ABSTRACT

Examples described herein include apparatuses and methods for full duplex device-to-device cooperative communication. Example systems described herein may include self-interference noise calculators. The output of a self-interference noise calculator may be used to compensate for the interference experienced due to signals transmitted by another antenna of the same wireless device or system. In implementing such a self-interference noise calculator, a selected wireless relaying device or wireless destination device may operate in a full-duplex mode, such that relayed messages may be transmitted as well as information from other sources or destinations during a common time period (e.g., symbol, slot, subframe, etc.).

10 Claims, 8 Drawing Sheets

(51) Int. Cl.
*H04W 4/40* (2018.01)
*H04W 76/14* (2018.01)
*H04L 5/00* (2006.01)
*H04L 25/02* (2006.01)

(56) References Cited

U.S. PATENT DOCUMENTS

| | | | |
|---|---|---|---|
| 9,391,680 | B2 | 7/2016 | Le-Ngoc et al. |
| 10,142,137 | B2 | 11/2018 | Luo et al. |
| 2002/0155821 | A1 | 10/2002 | Louis et al. |
| 2005/0060069 | A1 | 3/2005 | Breed et al. |
| 2008/0117411 | A1 | 5/2008 | Vuong et al. |
| 2009/0180404 | A1 | 7/2009 | Jung et al. |
| 2009/0233555 | A1 | 9/2009 | Nakamura |
| 2010/0027688 | A1 | 2/2010 | Suh et al. |
| 2010/0191391 | A1 | 7/2010 | Zeng |
| 2011/0171922 | A1 | 7/2011 | Kim et al. |
| 2012/0300680 | A1 | 11/2012 | Pietsch et al. |
| 2014/0003264 | A1* | 1/2014 | Shin ............... H04B 7/0689 370/252 |
| 2014/0056229 | A1 | 2/2014 | Li et al. |
| 2015/0055568 | A1 | 2/2015 | Jindal et al. |
| 2015/0140926 | A1* | 5/2015 | Fujio ............... H04B 7/15528 455/7 |
| 2015/0244436 | A1 | 8/2015 | Le-ngoc et al. |
| 2016/0226653 | A1 | 8/2016 | Bharadia et al. |
| 2017/0104576 | A1 | 4/2017 | Liu et al. |
| 2017/0150481 | A1* | 5/2017 | Gupta ............... H04L 1/1854 |
| 2017/0237547 | A1 | 8/2017 | Eltawil et al. |
| 2017/0257180 | A1 | 9/2017 | Aggarwal et al. |
| 2017/0273090 | A1 | 9/2017 | Jung et al. |
| 2018/0006690 | A1 | 1/2018 | Shepard et al. |
| 2018/0076947 | A1 | 3/2018 | Kazakevich et al. |
| 2018/0254930 | A1 | 9/2018 | Luo et al. |
| 2018/0278290 | A1* | 9/2018 | Moorti ............... H04B 1/123 |
| 2019/0007242 | A1 | 1/2019 | Luo et al. |
| 2019/0028260 | A1* | 1/2019 | Karlsson ............... H04L 5/1423 |
| 2019/0065945 | A1 | 2/2019 | Luo et al. |
| 2019/0065951 | A1 | 2/2019 | Luo et al. |
| 2019/0081767 | A1 | 3/2019 | Luo et al. |
| 2019/0123442 | A1 | 4/2019 | Vannucci et al. |

FOREIGN PATENT DOCUMENTS

| | | |
|---|---|---|
| EP | 1164758 A2 | 12/2001 |
| KR | 20130132817 A | 12/2013 |
| KR | 20160090372 A | 7/2016 |
| WO | 2004095625 A2 | 11/2004 |
| WO | 2016111638 A1 | 7/2016 |
| WO | 2019050980 A1 | 3/2019 |

OTHER PUBLICATIONS

U.S. Appl. No. 16/116,365 titled "Full Duplex Device-To-Device Cooperative Communication" filed Aug. 29, 2018, pp. all.

U.S. Appl. No. 16/105,915 titled "Wireless Devices and Systems Including Examples of Full Duplex Transmission", filed Aug. 20, 2018, pp. all.

U.S. Appl. No. 16/113,995 titled "Self Interference Noise Cancellation to Support Multiple Frequency Bands"; filed Aug. 27, 2018, pp. all.

International Search Report and Written Opinion dated Dec. 12, 2018 for PCT Application No. PCT/US2018/049598, 11 pages.

U.S. Appl. No. 15/890,275 entitled "Self Interference Noise Cancellation to Support Multiple Frequency Bands" filed Feb. 6, 2018.

U.S. Appl. No. 15/693,142, entitled "Cooperative Learning Neural Networks and Systems", filed Aug. 31, 2017.

U.S. Appl. No. 15/447,731 entitled "Wireless Devices and Systems Including Examples of Full Duplex Transmission", filed Mar. 2, 2017.

U.S. Appl. No. 16/561,868 titled "Wireless Devices and Systems Including Examples of Full Duplex Transmission Using Neural Networks Or Recurrent Neural Networks" filed Sep. 5, 2019, pp. all.

* cited by examiner

FULL DUPLEX DEVICE-TO-DEVICE COOPERATIVE COMMUNICATION

BACKGROUND

There is an interest in moving wireless communications to "fifth generation" (5G) systems. 5G promises increased speed and ubiquity, but methodologies for processing 5G wireless communications have not yet been set. Example 5G systems may be implemented using multiple-input multiple-output (MIMO) techniques, including "massive MIMO" techniques, in which multiple antennas (more than a certain number, such as 8 in the case of example MIMO systems) are utilized for transmission and/or receipt of wireless communication signals.

DETAILED DESCRIPTION

Figure 1:
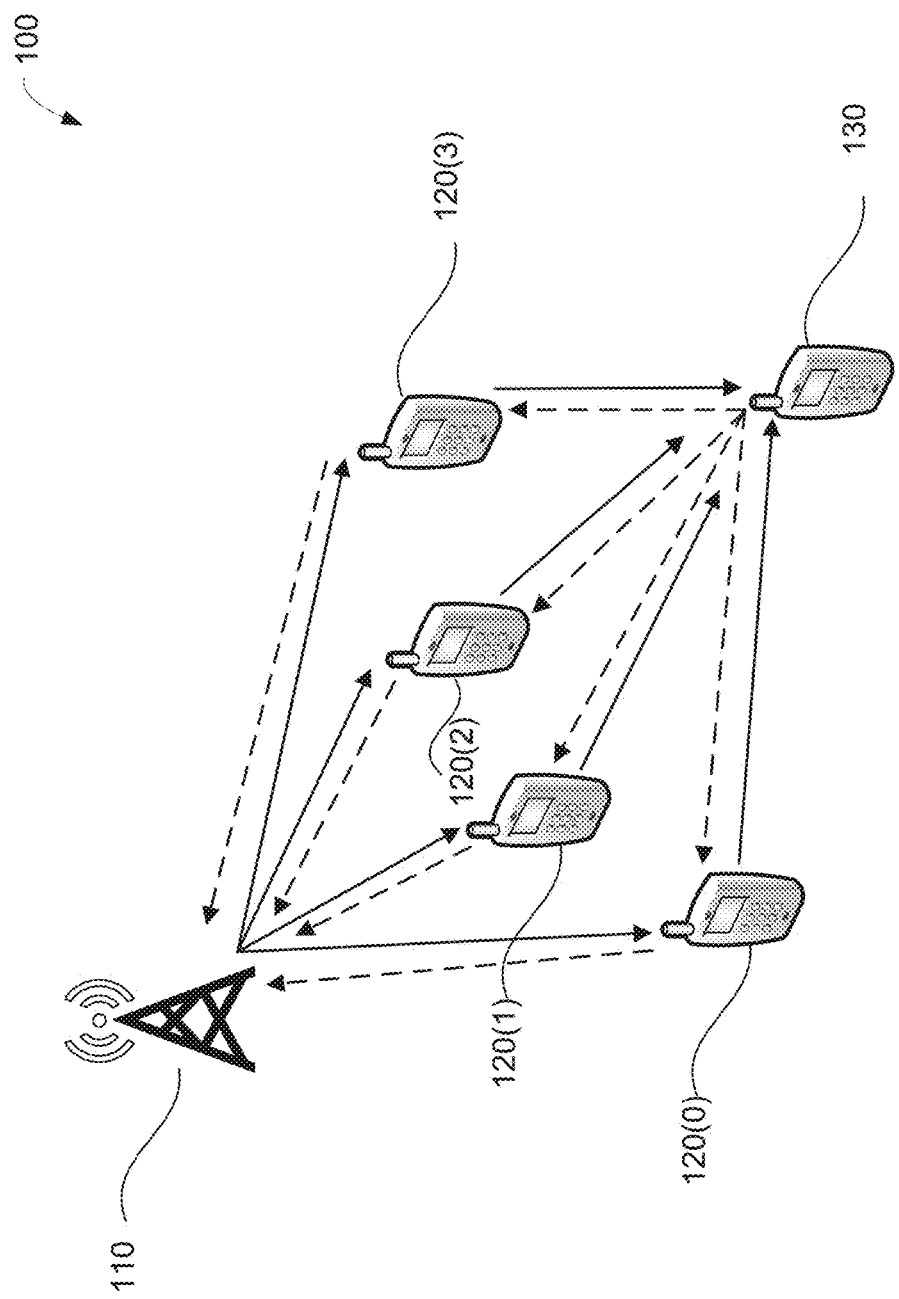
FIG. 1 is a schematic illustration of a wireless communication system arranged in accordance with embodiments of the disclosure.

Device-to-device cooperative communication may be used in wireless systems that include use of electronic devices to relay messages between a base station and destination electronic device. To improve efficiency, full duplex communication desirable to allow contemporaneous reception and transmission of messages. Full duplex communication generally may refer to an ability to both send and receive transmissions. In examples of systems employing full duplex communication, it may be desirable to cancel interference generated by other antennas in the system. Examples described herein may compensate for interference generated by other antennas co-located on the same physical device or system (e.g., interference created by an antenna on a MIMO device).

In the example of full duplexing (FD), an antenna transmitting a transmission on a certain frequency band may create interference for an antenna, co-located on the same device, receiving a transmission on the same frequency band. Such interference may be referred to as self-interference. Self-interference may disrupt the accuracy of signals transmitted or received by the MIMO device. Examples described herein may compensate for self-interference at an electronic device, which may aid in achieving full duplex transmission. A network of processing elements may be used to generate adjusted signals to compensate for self-interference generated by the antennas of the electronic device.

5G systems may advantageously make improved usage of full duplex transmission mode, for example, to improve spectrum efficiency. Frequency bands in some systems may be assigned by regulatory authorities such as the Federal Communication Commission (FCC) in the United States or similar national- or regional-level authorities in other jurisdictions. Assignments may be made, for example, according to different applications such as digital broadcasting and wireless communication. These licensed and assigned frequencies may be underused if devices simply employ time-division duplex (TDD), frequency-division duplex (FDD) or half-duplex FDD mode, which are duplexing modes often used in existing wireless applications. Such modes may limit the extent to which available spectrum resources may be exploited despite ever-increasing user demands for improved efficiency. Moreover, with the fast development of digital transmission and communications, there is increasing competition for access to unlicensed frequency bands and it may be advantageous to use both licensed and unlicensed frequency bands in a full duplex transmission mode.

For example, the FCC has officially proposed to open some UHF bands for unlicensed uses and is also considering how to use the frequency bands which are over 6 GHz (e.g. millimeter wave bands). Examples described herein may be utilized to achieve full duplex transmission in some examples on existing frequency bands including the aforementioned unlicensed frequency bands and 6 GHz bands. Full-duplex (FD) operation described herein may allow a wireless communication system to transmit and receive the signals, contemporaneously, in the same frequency band using spatial diversity. As used herein, contemporaneous means occurring during the same time period. Thus, messages or signals transmitted or received contemporaneously mean transmitted or received during the same time period, such as a single symbol period, slot, subframe, or other discrete duration. This may allow FD 5G systems to the spectrum efficiency of a frequency band.

FIG. 1 is a schematic illustration of a wireless communication system 100 arranged in accordance with embodiments of the disclosure. The system 100 includes a base station 110, electronic devices 120(0)-120(3), and an electronic device 130. The base station 110 is in communication with the electronic device 130 via the electronic devices 120(0)-120(3). That is, the electronic devices 120(0)-120(3) may implement device-to-device cooperative communication to relay information between the base station 110 and the electronic device 130. The electronic devices 120(0)-(3) and/or the electronic device 130 may be referred to as user equipment (UE), mobile terminals, or the like. The electronic devices 120(0)-(3) or the electronic device 130, or both, may be a particular category or class of UE, as may be defined by a wireless communication standard (e.g., LTE, 5G New Radio, etc.).

A category or class of UE may indicate or include various characteristics or capabilities, including number of antennas, duplexing capability, spatial multiplexing capability, or the like. The electronic devices 120(0)-(3) or the electronic device 130, or both, may provide an indication of their category or capability to base station 110, or to a network via bases station 110. In some examples, electronic devices 120(0)-(3) or the electronic device 130 may provide an indication of their respective category or capability to one another. The electronic devices 120(0)-(3) or the electronic device 130 may implement the techniques described herein or may be requested by one another or by base station 110 to implement techniques described herein according to their respective categories or capabilities. Devices having a same or similar category or capability may be referred to as peer devices and may thus facilitate peer-to-peer communications, which may be in contrast to communication between base station 110 and an electronic device 120(0)-(3) or electronic device 130.

In operation, the base station 110 may communicate with the electronic devices 120(0)-120(3) using a wireless communication protocol. Communication originating at base station 110 and terminating at an electronic device 120(0)-(3) or electronic device 130 may be referred to as a downlink or forward link communication. Such communication may also be referred to as occurring on the downlink. Communication originating at an electronic device 120(0)-(3) or electronic device 130 and terminating at base station 110 may be referred to as an uplink or reverse link communication. Such communication may also be referred to as occurring on the uplink. Communication between electronic devices 120(0)-(3) or between an electronic device 120(0)-(3) and an electronic device 130 (e.g., D2D communication) may be referred to as a sidelink. Such communication may also be referred to as occurring on the sidelink. The communication may be in accordance with any of a variety of protocols, including, but not limited to long term evolution (LTE), LTE advanced (LTE-A), 5G New Radio (NR) or other standards developed by the 3rd Generation Partnership Project (3GPP), for example. The communication may further include a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing.

The communication between the electronic devices 120(0)-120(3) and the electronic device 130 may support full duplex communication to relay data from the base station 110 to the electronic device 130 and from the electronic device 130 to the base station 110. For example, one of the electronic devices 120(0)-120(3) may relay information from the base station 110 to the electronic device 130. The relaying communication may be based on techniques that time-division multiplex data into different slots. Examples of time-division multiplex techniques used for relaying data may include generalized selection combining (GSC), distributed space-time coding (DSTC), and opportunistic relaying selection (ORS). Handshake protocols may be implemented to confirm received of data at the electronic device 130 from the base station 110, or at the base station 110 from the electronic device 130, such as acknowledgment (ACK) messages.

During a full-duplex communication, the electronic device 130 may contemporaneously receive a message from one of the electronic devices 120(0)-120(3) and transmit another message (e.g., an ACK message) to the same or another of the electronic devices 120(0)-120(3) via a common carrier frequency. In some responses, the transmitted message may be in response to a previously received message. In an example of a full-duplex transmission mode, a wireless transmitter and antenna pair of one of the electronic devices 120(0)-120(3) may communicate with a wireless receiver and antenna pair of the electronic device 130 contemporaneously with a wireless receiver and antenna pair of one (e.g., the same or different one) of the electronic devices 120(0)-120(3) communicating with a wireless transmitter and antenna pair of the electronic device 130. The communications may occur during predefined time periods (e.g., symbol periods, slots, subframes, etc.) according to an implemented protocol, such as one of the GSC, DSTC, or ORS protocols.

To enable full-duplex communication, self-interference received by a receiving antenna from a transmitting antenna on the same device (e.g., one of the electronic devices 120(0)-120(3) or the electronic device 130) may be compensated for to filter out signals from the transmitted antenna. Self-interference may generally refer to any wireless interference generated by transmissions from antennas of an electronic device to signals received by other antennas, or same antennas, on that same electronic device.

The base station 110, the electronic devices 120(0)-120(3), and the electronic device 130 may be implemented using generally any electronic device for which communication capability is desired. For example, the base station 110 may be implemented using a Wi-Fi access point, an LTE/LTE-A evolved node B (eNB) LTE/LTE-A), or a 5G next generation node B (gNB), or other standardized base station. Each of the electronic devices 120(0)-120(3) and the electronic device 130 may be implemented using a mobile phone, smartwatch, computer (e.g. server, laptop, tablet, desktop), or radio. In some examples, the electronic devices 120(0)-120(3) and/or the electronic device 130 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 1, the base station 110, the electronic devices 120(0)-120(3) and/or the electronic device 130 may include any of a variety of components in some examples, including, but not limited to, memory, input/output devices, circuitry, processing units (e.g. processing elements and/or processors), or combinations thereof.

Each of the base station 110, the electronic devices 120(0)-120(3), and the electronic device 130 may support multiple input, multiple output (MIMO) systems, MIMO systems generally refer to systems including one or more electronic devices that transmit signals using multiple antennas and one or more electronic devices that receive signals using multiple antennas. In some examples, electronic devices may both transmit and receive signals using multiple antennas. Some example systems described herein may be "massive MIMO" systems. Generally, massive MIMO systems refer to systems employing greater than a certain number (e.g. 64) antennas to transmit and/or receive transmissions. As the number of antennas increase, so to generally does the complexity involved in accurately transmitting and/or receiving transmissions. Thus, the base station 110, the electronic devices 120(0)-120(3), and the electronic device 130 may each include multiple antennas, including 2, 3, 4, 5, 6, 7, 8, 9, 10, 11, 12, 13, 14, 15, 16, 32, or 64 antennas to support a MIMO system. Other numbers of antennas may be used in other examples. In some examples, the electronic devices 120(0)-120(3) and the electronic device 130 may have a same number of antennas, and a different number of antennas than the base station 110. In other examples, the base station 110, the electronic devices 120(0)-120(3), and the electronic device 130 may each have different numbers of antennas.

Although one base station 110, four electronic devices 120(0)-120(3), and one electronic device 130 are shown in FIG. 1, the system may include any number of base stations and electronic devices may.

The base station 110, the electronic devices 120(0)-120(3), and the electronic device 130 may each include receivers, transmitters, and/or transceivers. Generally, receivers may be provided for receiving transmissions from one or more connected antennas, transmitters may be provided for transmitting transmissions from one or more connected antennas, and transceivers may be provided for receiving and transmitting transmissions from one or more connected antennas. Generally, multiple receivers, transmitters, and/or transceivers may be provided in an electronic device—one in communication with each of the antennas of the electronic device. The transmissions may be in accordance with any of a variety of protocols, including, but not limited to 5G NR signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (LTMC) transmission, bi-orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards. In some examples, techniques described herein may be employed by a relay node, which may have the same or similar functionality as a base station or access point. Or a relay node may provide more limited functionality than a base station but may be a fixed terminal or node that receives and forwards (e.g., repeats) a signal received from one device (e.g., a UE) to another device (e.g., a base station).

Examples of transmitters, receivers, and/or transceivers may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

Figure 2A:
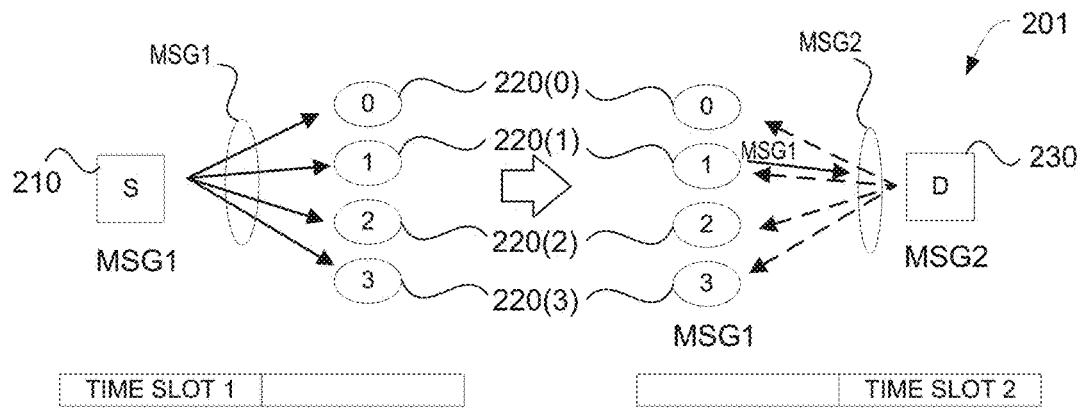
FIGS. 2A-2C are diagrams of time-multiplex communication protocols that support full duplex communication in accordance with embodiments of this disclosure.
Figure 2B:
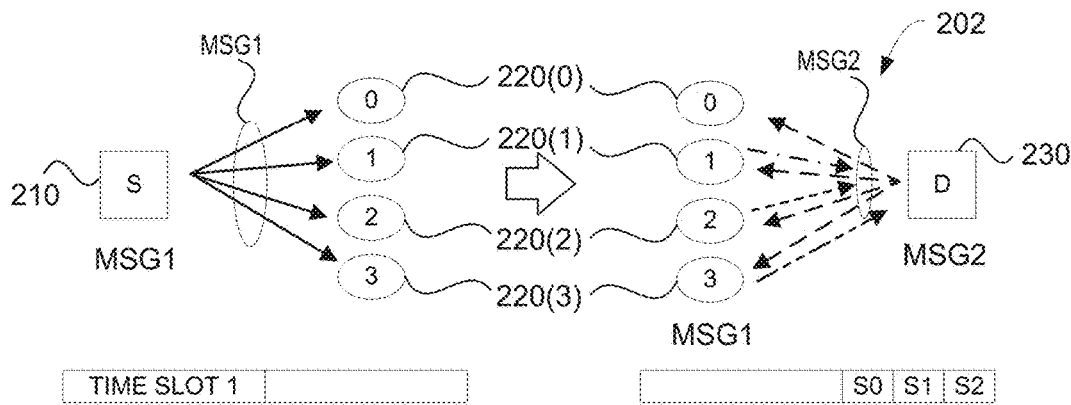
Figure 2C:
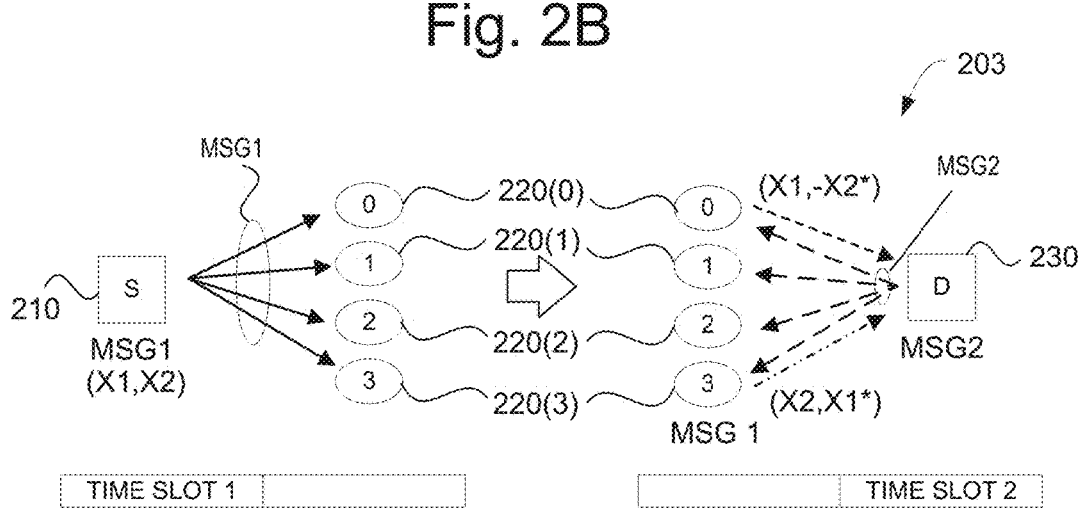

FIGS. 2A-2C are diagrams of time-division multiplexed communication techniques that support full duplex communication in accordance with embodiments of this disclosure. FIG. 2A is a diagram 201 of an ORS protocol that supports full duplex communication in accordance with an embodiment of the disclosure. FIG. 2B is a diagram 202 of a GSC protocol that supports full duplex communication in accordance with an embodiment of the disclosure. FIG. 2C is a diagram 203 of a DSTC system that supports full duplex communication in accordance with an embodiment of the disclosure. The base station 210 of FIGS. 2A-2C may be used to implement the base station 110 of FIG. 1. The electronic devices 120(0)-120-3) of FIGS. 2A-2C may be used to implement the electronic devices 120(0)-120-3) of FIG. 1. The electronic device 230 of FIGS. 2A-2C may be used to implement the electronic device 130 of FIG. 1.

Referring to FIG. 2A and implementation of an ORS protocol, during a first time period (e.g., Time Slot 1), the base station 210 may transmit a first message MSG1 to the electronic devices 220(0)-220(3). In an ORS system, one of the electronic devices 220(0)-220(3) is selected to relay the MSG1 message from the base station 210 to the electronic device 230 on the basis of various characteristics, such as signal quality, signal interference, history of successful transmissions, stability of potential relay devices, etc. Therefore, as shown in FIG. 2A, during a second time period (e.g., Time Slot 2), the electronic device 220(1) is selected to relay the MSG1 message to the electronic device 230. Contemporaneously with transmission of the MSG1 message by the electronic device 220(1) (e.g., during Time Slot 2), the electronic device 230 may transmit a second message MSG2 to the electronic devices 220(0)-220(3), similar to the manner in which the base station 210 transmits the MSG1 to the electronic devices 220(0)-220(3). The MSG2 message may be in response to a previously received message from one of the electronic devices 220(0)-220(3). For example, MSG2 may be an acknowledgment message associated a previously-received message (e.g., a message sent from base station 210 or from one of the electronic devices 220(0)-(3)). In a subsequent time period (not shown), one of the electronic devices 220 may be chosen to transmit the MSG2 to the base station 210. The manner or criteria for choosing the device 220 for transmission from an electronic device 230 to base station 210 may be similar to the manner or criteria for choosing an electronic device 230 to transmit the MSG1 message during the Time Slot 2. To support the contemporaneous transmission from and reception at the electronic device 230, the electronic device 230 may include a self-interference calculator to determine interference at a receiving antenna of the electronic device 230 caused by transmission of the MSG2 message to provide an interference signal and a compensation circuit to compensate for that interference in a received signal at the receiving antenna based on the interference signal. By compensating for the interference, the MSG1 message may be successfully demodulated and decoded at the electronic device 230. It is understood that the contemporaneous transmissions described with reference to FIG. 2A may use a common carrier frequency, in some examples. The transmissions may use different carrier frequencies in other examples.

Referring to FIG. 2B and implementation of a GSC protocol, during a first time period (e.g., Time Slot 1, which may be symbol period, slot, subframe, or the like), the base station 210 may transmit a first message MSG1 to the electronic devices 220(0)-220(3). In an GSC system, the MSG1 message may divided into multiple parts to be transmitted by a selected two or more of the electronic devices 220(0)-220(3) in a time division duplex (TDD) protocol, with each of the selected two or more of the electronic devices 220(0)-220(3) transmitting an assigned part of the MSG1 message during an assigned time slot. The associated GSC specification may define an algorithm for segmentation and assignment or selection of the two or more electronic devices 220(0)0(3).

In the example depicted in FIG. 2, during a time period S1, the electronic device 220(1) may transmit a first part of the MSG1 message to the electronic device 230. During a time period S2, the electronic device 220(2) may transmit a second part of the MSG1 message to the electronic device 230. During a time period S3, the electronic device 220(3) may transmit a third part of the MSG1 message to the electronic device 230. A number of selected relays may be based on various characteristics, such number of available relays, traffic through each relay, signal quality, magnitude of interference, history of successful transmissions, stability of potential relays, etc. The associated GSC specification may define that the selected relays are identified in a control plan (e.g., or control channel) associated with all of the related devices (e.g., including some or all of the base station 210, the electronic devices 220(0)-(3) and the electronic device 230), and the control plan may use an algorithm defined in the associated GSC specification to perform the selection of the relays.

The number of parts in into which the MSG1 message is divided may be based on a number of selected electronic devices to be used as relays. By dividing the transmission among multiple devices, a communication burden on any single one of the electronic devices 220(0)-220(3) may be reduced as compared with using a single electronic device to transmit the MSG1 message. In time period 2, the electronic device 220(1) is selected to relay the MSG1 message to the electronic device 230. Contemporaneously with transmission of the MSG1 message by the electronic devices 220 (1)-220(3) (e.g., during all or part of time slots S1, S2, and S3), the electronic device 230 may transmit a second message MSG2 to the electronic devices 220(0)-220(3), similar to the transmission of the MSG1 from the base station 210 to the electronic devices 220(0)-220(3). The MSG2 message may be in response to a previously received message from one or more of the electronic devices 220(0)-220(3).

In some examples, in a subsequent time period (not shown), a selected subset (or all) of the electronic devices 220(0)-220(3) may retransmit a part of the MSG2 message to the base station 210. To support the contemporaneous transmission and reception at the electronic device 230, the electronic device 230 may include a self-interference calculator to determine interference at receiving antennas of the electronic device 230 caused by transmission of the MSG2 message from the electronic device 230 and a compensation circuit to compensate for that interference in received signals from each of the electronic devices 220(0)-220(3) at the respective receiving antenna. By compensating for the interference, the parts of the MSG1 message may be successfully demodulated, decoded, and recombined to form the MSG1 at the electronic device 230. It is understood that the contemporaneous transmissions described with reference to FIG. 2B may use a common carrier frequency, in some examples. The transmissions may use different carrier frequencies in other examples.

Referring to FIG. 2C and implementation of a DSTC protocol, during a first time period (e.g., Time Slot 1), the base station 210 may transmit a first message MSG1 to the electronic devices 220(0)-220(3). In a DSTC system, the MSG1 message transmitted as data vector (X1, X2). The data vector (X1, X2) may be used to generate codes (X1, −X2*) and (X2, X1*), where the "*" indicates a complex conjugate. Two of the electronic devices 220(0)-220(3) may be selected to each transmit a respective one of the codes (X1, −X2*) and (X2, X1*). The associated DSTC specification may define a protocol and an algorithm for generating and transmitting messages that include one or both of the codes (X1, −X2*). As shown in FIG. 2, during a second time slot (e.g., Time Slot 2), the electronic device 220(0) may transmit the code (X1, −X2*) to the electronic device 230 and the electronic device 220(3) may transmit code (X2, X1*) to the electronic device 230. The selected electronic devices of the electronic devices 220(0)-220(3) may be based on various characteristics, such number of available relays, traffic through each relay, signal quality, magnitude of interference, history of successful transmissions, stability of potential relays, etc. The associated DSTC specification may define that the selected relays are identified in a control plan (e.g., or control channel) associated with all of the related devices (e.g., including some or all of the base station 210, the electronic devices 220(0)-(3) and the electronic device 230), and the control plan may use an algorithm defined in the associated DSTC specification to perform the selection of the relays.

By dividing the transmission among multiple devices, a communication burden on any single one of the electronic devices 220(0)-220(3) may be reduced as compared with using a single electronic device to transmit the MSG1 message. Time Slot 2), the electronic device 220(1) is selected to relay the MSG1 message to the electronic device 230. Contemporaneously with transmission of the MSG1 message by the electronic devices 220(0) and 220(3) (e.g., during Time Slot 2), the electronic device 230 may transmit a second message MSG2 to the electronic devices 220(0)-220(3), similar to the transmission of the MSG1 from the base station 210 to the electronic devices 220(0)-220(3). The MSG2 message transmitted as data vector (Y1, Y2). The MSG2 message may be in response to a previously received message from one or more of the electronic devices 220(0)-220(3). In a subsequent time slot (not shown), a two selected electronic devices of the electronic devices 220(0)-220(3) may retransmit the codes (Y1, −Y2*) and (Y2, Y1*), where the "*" indicates a complex conjugate, generated from the data vector (Y1, Y2). To support the contemporaneous transmission and reception at the electronic device 230, the electronic device 230 may include a self-interference calculator to determine interference at receiving antennas of the electronic device 230 caused by transmission of the MSG2 message from the electronic device 230 to provide interference signals and a compensation circuit to compensate for that interference in received signals from each of the electronic devices 220(0)-220(3) at the respective receiving antenna according to the interference signals. By compensating for the interference, the codes (X1, −X2*) and (X2, X1*) of the MSG1 message may be successfully demodulated, decoded, and recombined to form the MSG1 at the electronic device 230. It is understood that the contemporaneous transmissions described with reference to FIG. 2C may use a common carrier frequency, in some examples. The transmissions may use different carrier frequencies in other examples.

Figure 3:
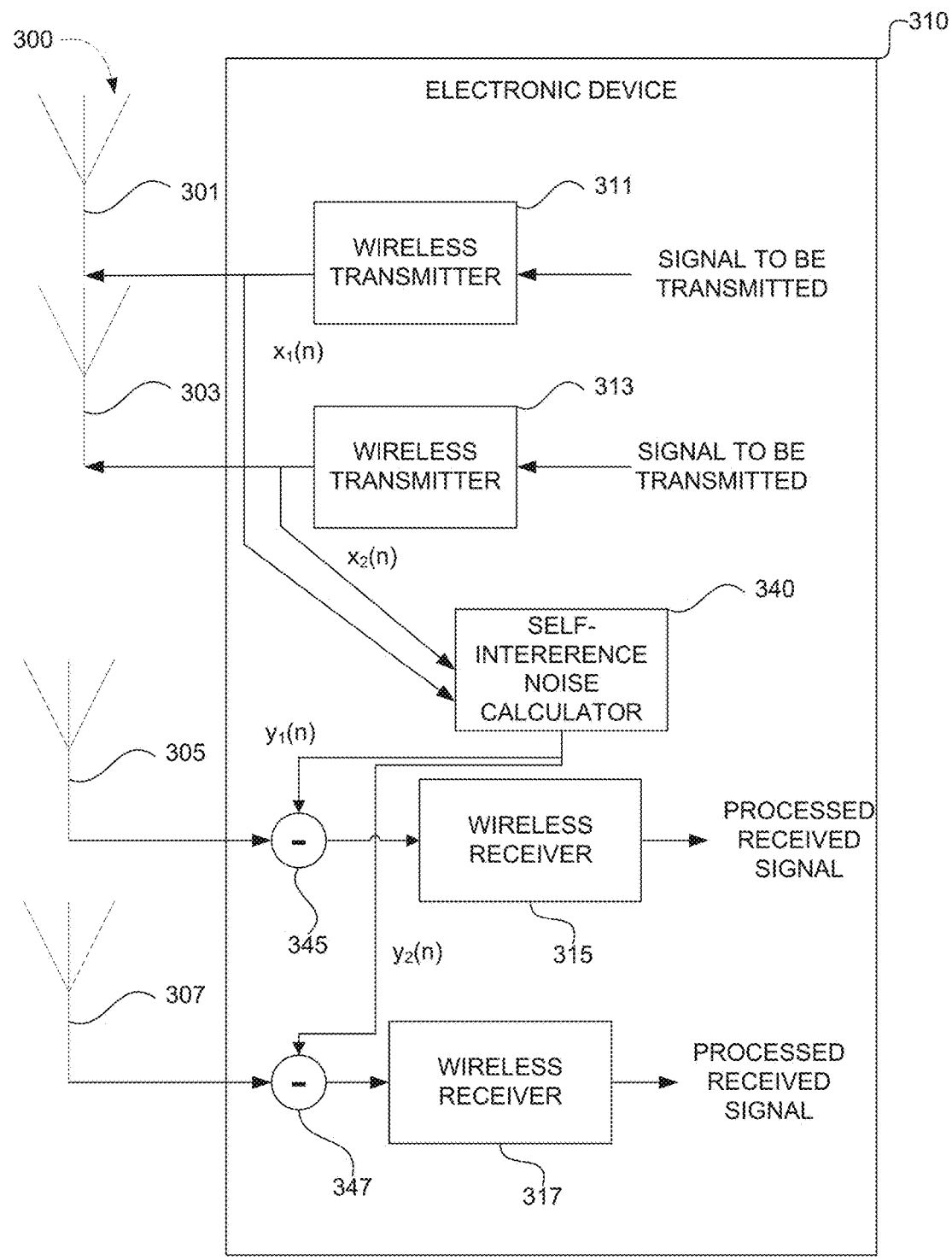
FIG. 3 is a schematic illustration of an electronic device arranged in accordance with embodiments of the disclosure.

FIG. 3 is a schematic illustration of an electronic device 310 arranged in accordance with embodiments of the disclosure. The electronic device 310 may also include self-interference noise calculator 340, compensation component 345, and compensation component 347. FIG. 3 is a schematic illustration 300 of an electronic device 310 arranged in accordance with embodiments of the disclosure. The electronic device 310 may also include self-interference noise calculator 340, compensation component 345, and compensation component 347. Self-interference noise calculator 340 and wireless transmitter 311, 313 may be in communication with one another. Each wireless transmitter 311, 313 may be in communication with a respective antenna, such as antenna 301, antenna 303. Each wireless transmitter 311, 313 receives a respective signal to be transmitted, such as signals to be transmitted. The wireless receivers 315, 317 may process the signals to be transmitted with the operations of a radio-frequency (RF) front-end to generate transmitter output data $x_1(n)$, $x_2(n)$. The wireless transmitter 311, 313 may process the signals to be transmitted as a wireless transmitter, for example. The electronic device 310 may be used to implement any of the base station 110, the electronic devices 120(0)-120-3), or the electronic device 130 of FIG. 1, any of the base station 210, electronic devices 220(0)-220-3), or the electronic device 230 of FIGS. 2A-2C, or combination s thereof.

Self-interference noise calculator 340 and compensation components 345, 347 may be in communication with one another. Each wireless receiver may be in communication with a respective antenna, such as antenna 305, 307 and a respective compensation component, such as compensation component 345, 347. In some examples, a wireless transmission received at antennas 305, 307 may be communicated to wireless receiver 315, 317 after compensation of self-interference by the respective compensation component 245, 247. Each wireless receiver 315, 317 processes the received and compensated wireless transmission to produce a respective processed received signal. In other examples, fewer, additional, and/or different components may be provided.

Examples of self-interference noise calculators described herein may generate and provide adjusted signals (e.g., interference signals) to compensation components. So, for example, the self-interference noise calculator 340 may generate adjusted signals $y_1(n)$, $y_2(n)$ and provide such adjusted signals to the compensation components 345, 347. The self-interference noise calculator 340 may generate such adjusted signals $y_1(n)$, $y_2(n)$ on the basis of transmitter output data $x_1(n)$, $x_2(n)$. The self-interference noise calculator 340 may be in communication with multiple (e.g. all) of the wireless transmitters of the electronic device 310 and all the respective compensation components coupled to respective wireless receivers, and may provide adjusted signals based on transmitter output data.

It may be desirable in some examples to compensate for the self-interference noise to achieve full duplex transmission. For example, it may be desirable for wireless transmitters 311, 313 of the electronic device 310 to transmit wireless transmission signals at a certain frequency band; and, at the same time or simultaneously, wireless receivers 315, 317 receive wireless transmission signals on that same frequency band. The self-interference noise calculator 340 may determine the self-interference contributed from each wireless transmission based on the transmitter output data to compensate each received wireless transmission with an adjusted signal $y_1(n)$, $y_2(n)$. Particularly as wireless communications move toward 5G standards, efficient use of wireless spectra may become increasingly important.

Examples of self-interference noise calculators described herein may provide the adjusted signals adjusted signals $y_1(n)$, $y_2(n)$ to receiver(s) and/or transceiver(s). Compensation components 345, 347 may receive the adjusted signals $y_1(n)$, $y_2(n)$ and compensate for an incoming received wireless transmission from antennas 305, 307. For example, the compensation components 345, 347 may combine the adjusted signals with the incoming received wireless transmission in a manner which compensates for reduces) self-interference. In some examples, the compensation components 345, 347 may subtract the adjusted signals $y_1(n)$, $y_2(n)$ from the received wireless transmission to produce compensated received signals for the respective wireless receivers 315, 317. The compensation components 345, 347 may communicate the compensated received signals to the wireless receivers 315, 317. The wireless receivers 315, 317 may process the compensated received signal with the operations of a radio-frequency (RF) front-end. The wireless receiver may process the compensated received signals as a wireless receiver 500, for example. While the compensation components 345, 347 have been described in terms of subtracting an adjusting signal from a received wireless transmission, it can be appreciated that various compensations may be possible, such as adjusted signal that operates as a transfer function compensating the received wireless transmission or an adjusted signal that operates as an optimization vector to multiply the received wireless transmission. Responsive to such compensation, electronic device 310 may transmit and receive wireless communications signals in a full duplex transmission mode.

Examples of self-interference noise calculators described herein, including the self-interference noise calculator 340 of FIG. 3 may be implemented using hardware, software, firmware, or combinations thereof. For example, self-interference noise calculator 340 may be implemented using circuitry and/or one or more processing unit(s) (e.g. processors) and memory encoded with executable instructions for causing the self-interference noise calculator to perform one or more functions described herein.

For clarity, FIG. 3 depicts antennas 301, 303 coupled to wireless transmitters 311, 313, respectively, and antennas 305, 307 coupled to wireless receivers 315, 317, respectively. However, without departing from the scope of the disclosure, it is appreciated that one or both of the antennas 301, 303 may also be coupled to a wireless receiver (e.g., including functionality described with reference to the wireless receivers 315, 317), and/or that one or both of the antennas 305, 307 may also be coupled to a wireless transmitter (e.g., including functionality described with reference to the wireless transmitters 311, 313). It is also appreciated that one or more of the wireless transmitters 311, 313 and the wireless receivers 315, 317 may be modified to include both transmitting (e.g., functionality described with reference to the wireless transmitters 311, 313) and receiving (e.g., functionality described with reference to the wireless receivers 315, 317) capabilities (e.g., a transceiver).

Figure 4:
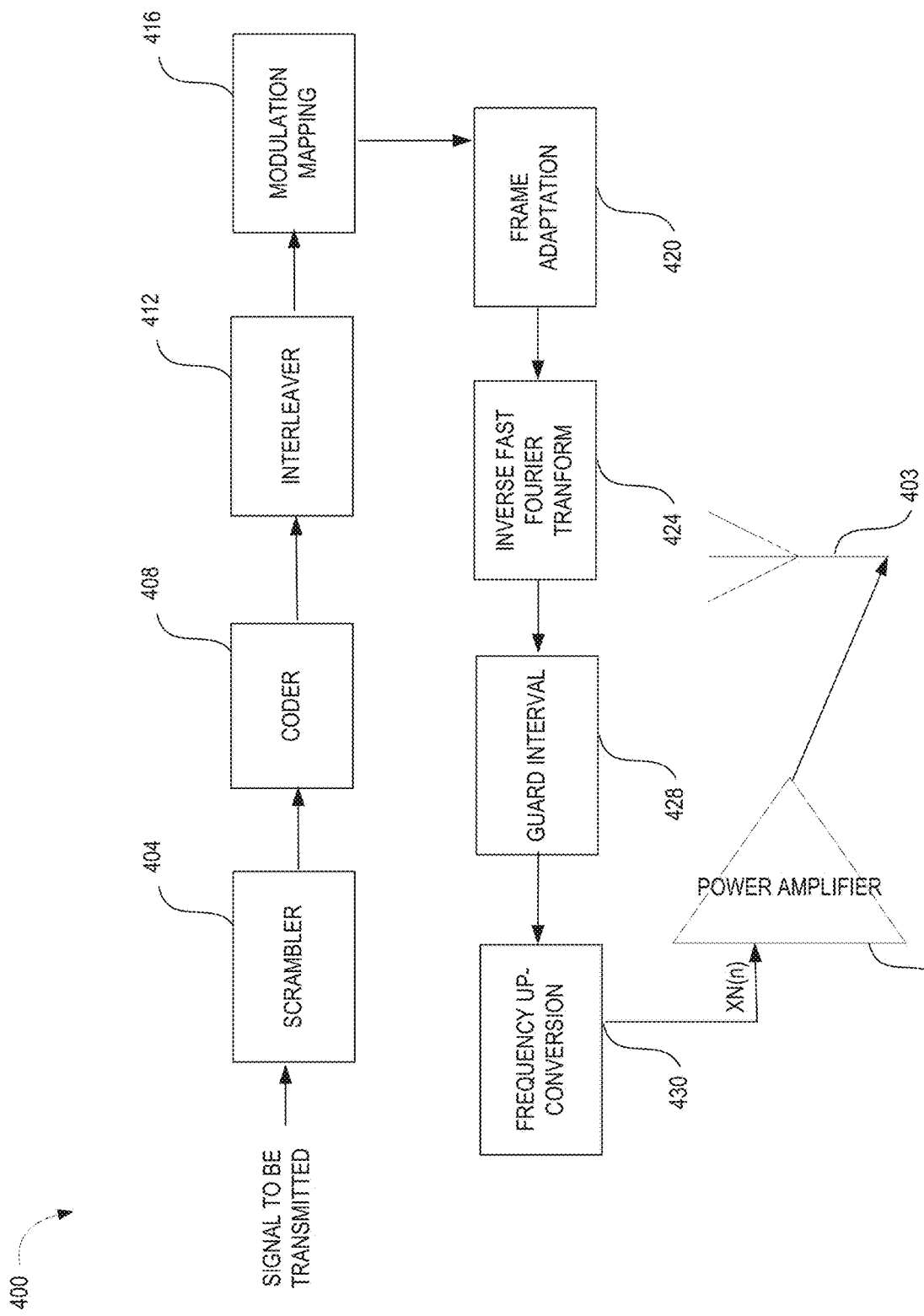
FIG. 4 is a schematic illustration of a wireless transmitter in accordance with an embodiment of the disclosure.

FIG. 4 is a schematic illustration of a wireless transmitter 400 in accordance with an embodiment of the disclosure. The wireless transmitter 400 receives a signal to be transmitted and performs operations of an RF-front end to generate wireless communication signals for transmission via the antenna 403. The wireless transmitter 400 may be utilized to implement in any wireless transmitter of any of the base station 110, the electronic devices 120(0)-120(3) or the electronic device 130 of FIG. 1, any of the base station 110, the electronic devices 220(0)-220(3), or the electronic device 230 of FIG. 2, or the wireless transmitters 311, 313 in FIG. 3, for example. The transmitter output data $x_N(n)$ is amplified by a power amplifier 432 before the output data are transmitted on an RF antenna 436. The operations of the RF-front end may generally be performed with analog circuitry or processed as a digital baseband operation for implementation of a digital front-end. The operations of the RF-front end include a scrambler 404, a coder 408, an interleaver 412, a modulation mapping 416, a frame adaptation 420, an IFFT 424, a guard interval 428, and frequency up-conversion 430.

The scrambler 404 converts the input data to a pseudo-random or random binary sequence. For example, the input data may be a transport layer source (such as MPEG-2 Transport stream and other data) that is converted to a Pseudo Random Binary Sequence (PRBS) with a generator polynomial. While described in the example of a generator polynomial, various scramblers 404 are possible. The coder 408 may encode the data outputted from the scrambler to code the data. For example, a Reed-Solomon (RS) encoder or turbo encoder may be used as outer coder to generate a parity block for each randomized transport packet fed by the scrambler 404. In some examples, the length of parity block and the transport packet can vary according to various wireless protocols. The interleaver 412 may interleave the parity blocks output by the coder 408, for example, the interleaver 412 may utilize convolutional byte interleaving. In some examples, additional coding and interleaving can be performed after the coder 408 and interleaver 412. For example, additional coding may include an inner coder that may further code data output from the interleaver, for example, with a punctured convolutional coding having a certain constraint length. Additional interleaving may include an inner interleaver that forms groups of joined blocks. While described in the context of a RS coding, Turbo coding, and punctured convolution coding, various coders 408 are possible, such as a low-density parity-check (LDPC) coder or a polar coder. While described in the context of convolutional byte interleaving, various interleavers 412 are possible.

The modulation mapping 416 modulates the data outputted from the interleaver 412. For example, quadrature amplitude modulation (QAM) can map the data by changing (e.g., modulating) the amplitude of the related carriers. Various modulation mappings can be possible, including, but not limited to: Quadrature Phase Shift Keying (QPSK), SCMA NOMA, and MUSA (Multi-user Shared Access). Output from the modulation mapping 416 may be referred to as data symbols. While described in the context of QAM modulation, various modulation mappings 416 are possible. The frame adaptation 420 may arrange the output from the modulation mapping according to bit sequences that represent corresponding modulation symbols, carriers, and frames.

The IFFT 424 may transform symbols that have been framed into sub-carriers (e.g., by frame adaptation 420) into time-domain symbols. Taking an example of a 5G wireless protocol scheme, the IFFT can be applied as N-point IFFT:

$$x_k = \sum_{n=1}^{N} X_n e^{i2\pi kn/N} \quad (1)$$

where $X_n$ is the modulated symbol sent in the n'th 5G sub-carrier. Accordingly, the output of the IFFT 424 may form time-domain 5G symbols. In some examples, the IFFT 424 may be replaced by a pulse shaping filter or poly-phase filtering banks to output symbols for frequency up-conversion 430. The guard interval 428 adds a guard interval to the time-domain 5G symbols. For example, the guard interval may be a fractional length of a symbol duration that is added, to reduce inter-symbol interference, by repeating a portion of the end of a time-domain 5G symbol at the beginning of the frame. For example, the guard interval can be a time period corresponding to the cyclic prefix portion of the 5G wireless protocol scheme. The frequency up-conversion 430 may up-convert the time-domain 5G symbols to a specific radio frequency. For example, the time-domain 5G symbols can be viewed as a baseband frequency range and a local oscillator can mix the frequency at which it oscillates with the 5G symbols to generate 5G symbols at the oscillation frequency. A digital up-converter (DUC) may also be utilized to convert the time-domain 5G symbols. Accordingly, the 5G symbols can be up-converted to a specific radio frequency for an RF transmission. Before transmission, at the antenna 403, a power amplifier 432 may amplify the transmitter output data $x_N(n)$ 410 to output data for an RF transmission in an RF domain at the antenna 436. The antenna 436 may be an antenna designed to radiate at a specific radio frequency. For example, the antenna 436 may radiate at the frequency at which the 5G symbols were up-converted. Accordingly, the wireless transmitter 400 may transmit an RF transmission via the antenna 436 according to the signal to be transmitted 411 received at the scrambler 404. As described above with respect to FIG. 4, the operations of the wireless transmitter 400 can include a variety of processing operations. Such operations can be implemented in a conventional wireless transmitter, with each operation implemented by specifically-designed hardware for that respective operation. For example, a DSP processing unit may be specifically-designed to implement the IFFT 424. As can be appreciated, additional operations of wireless transmitter 400 may be included in a conventional wireless receiver.

Figure 5:
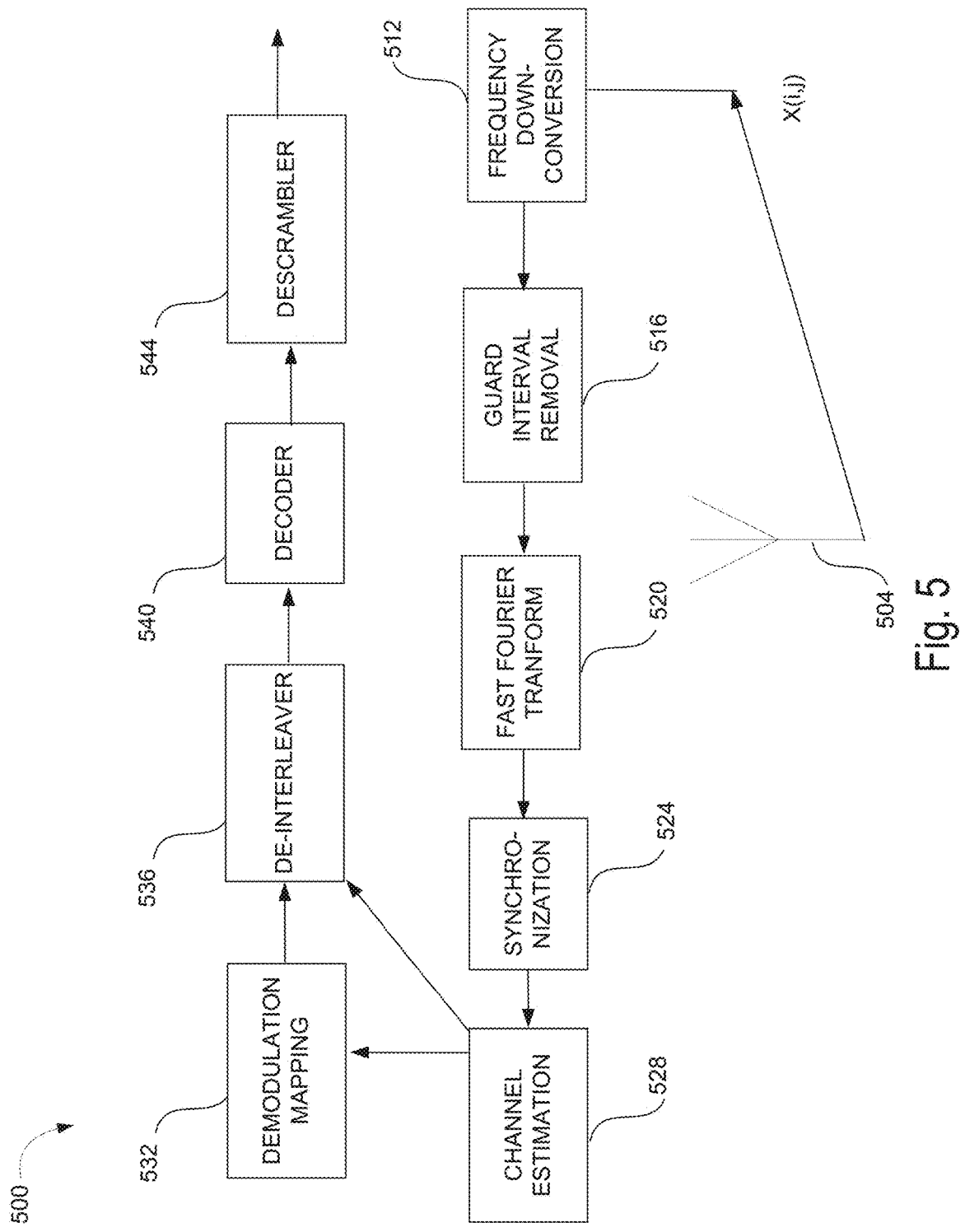
FIG. 5 is a schematic illustration of wireless receiver in accordance with embodiments of this disclosure.

FIG. 5 is a schematic illustration of wireless receiver 500 in accordance with embodiments of this disclosure. The wireless receiver 500 receives input data X (i,j) from an antenna 504 and performs operations of a RF wireless receiver to generate receiver output data at the descrambler 544. The wireless receiver 500 may be utilized to implement in any wireless receiver of any of the base station 110, the electronic devices 120(0)-120(3), or the electronic device 130 of FIG. 1, any wireless receiver of any of the base station 210, the electronic devices 220(0)-220(3), or the electronic device 230 of FIG. 2, or the wireless receivers 315, 317 in FIG. 3. The antenna 504 may be an antenna designed to receive at a specific radio frequency. The operations of the RF wireless receiver may be performed with analog circuitry or processed as a digital baseband operation for implementation of a digital front-end. The operations of the RF wireless receiver include a frequency down-conversion 512, guard interval removal 516, a fast Fourier transform (FTT) 520, synchronization 524, channel estimation 528, a demodulation mapping 532, a de-interleaver 536, a decoder 540, and a descrambler 544.

The frequency down-conversion 512 may down-convert the frequency domain symbols to a baseband processing range. For example, continuing in the example of a 5G implementation, the frequency-domain 5G symbols may be mixed with a local oscillator frequency to generate 5G symbols at a baseband frequency range. A digital down-converter (DDC) may also be utilized to convert the frequency domain symbols. Accordingly, the RF transmission including time-domain 5G symbols may be down-converted to baseband. The guard interval removal 516 may remove a guard interval from the frequency-domain 5G symbols. The FFT 520 may transform the time-domain 5G symbols into frequency-domain 5G symbols. Taking an example of a 5G wireless protocol scheme, the FFT can be applied as N-point FFT:

$$X_n = \sum_{k=1}^{N} x_k e^{-i2\pi kn/N} \quad (2)$$

where $X_n$ is the modulated symbol sent in the n'th 5G sub-carrier. Accordingly, the output of the FFT 520 may form frequency-domain 5G symbols. In some examples, the FFT 520 may be replaced by poly-phase filtering banks to output symbols for synchronization 524.

The synchronization 524 may detect pilot symbols in the 5G symbols to synchronize the transmitted data. In some examples of a 5G implementation, pilot symbols may be detected at the beginning of a frame (e.g., in a header) in the time-domain. Such symbols can be used by the wireless receiver 500 for frame synchronization. With the frames synchronized, the 5G symbols proceed to channel estimation 528. The channel estimation 528 may also use the time-domain pilot symbols and additional frequency-domain pilot symbols to estimate the time or frequency effects (e.g., path loss) to the received signal. For example, a channel may be estimated on the basis of N signals received through N antennas (in addition to the antenna 504) in a preamble period of each signal. In some examples, the channel estimation 528 may also use the guard interval that was removed at the guard interval removal 516. With the channel estimate processing, the channel estimation 528 may compensate for the frequency-domain 5G symbols by some factor to minimize the effects of the estimated channel. While channel estimation has been described in terms of time-domain pilot symbols and frequency-domain pilot symbols, other channel estimation techniques or systems are possible, such as a MIMO-based channel estimation system or a frequency-domain equalization system. The demodulation mapping 532 may demodulate the data outputted from the channel estimation 528. For example, a quadrature amplitude modulation (QAM) demodulator can map the data by changing (e.g., modulating) the amplitude of the related carriers. Any modulation mapping described herein can have a corresponding demodulation mapping as performed by demodulation mapping 532. In some examples, the demodulation mapping 532 may detect the phase of the carrier signal to facilitate the demodulation of the 5G symbols. The demodulation mapping 532 may generate bit data from the 5G symbols to be further processed by the de-interleaver 536.

The de-interleaver 536 may deinterleave the data bits, arranged as parity block from demodulation mapping into a bit stream for the decoder 540, for example, the de-interleaver 536 may perform an inverse operation to convolutional byte interleaving. The de-interleaver 536 may also use the channel estimation to compensate for channel effects to the parity blocks. The decoder 540 may decode the data outputted from the scrambler to code the data. For example, a Reed-Solomon (RS) decoder or turbo decoder may be used as a decoder to generate a decoded bit stream for the descrambler 544. For example, a turbo decoder may implement a parallel concatenated decoding scheme. In some examples, additional decoding deinterleaving may be performed after the decoder 540 and de-interleaver 536. For example, additional coding may include an outer coder that may further decode data output from the decoder 540. While described in the context of a RS decoding and turbo decoding, various decoders 540 are possible, such as low-density parity-check (LDPC) decoder or a polar decoder. The descrambler 544 may convert the output data from decoder 540 from a pseudo-random or random binary sequence to original source data. For example, the descrambler 544 may convert decoded data to a transport layer destination (e.g., MPEG-2 transport stream) that is descrambled with an inverse to the generator polynomial of the scrambler 404 of FIG. 4. The descrambler thus outputs receiver output data. Accordingly, the wireless receiver 500 receives an RF transmission including input data X (i,j) 410 via to generate the receiver output data.

As described above with respect to FIG. 5, the operations of the wireless receiver 500 can include a variety of processing operations. Such operations can be implemented in a conventional wireless receiver, with each operation implemented by specifically-designed hardware for that respective operation. For example, a DSP processing unit may be specifically-designed to implement the FFT 520. As can be appreciated, additional operations of wireless receiver 500 may be included in a conventional wireless receiver.

Further, in some embodiments, the wireless transmitter 400 of FIG. 4 and the wireless receiver 500 of FIG. 5 may be combined into a single wireless transceiver capable of performing both transmitting and receiving functions described with reference to FIGS. 4 and 5, respectively.

Figure 6:
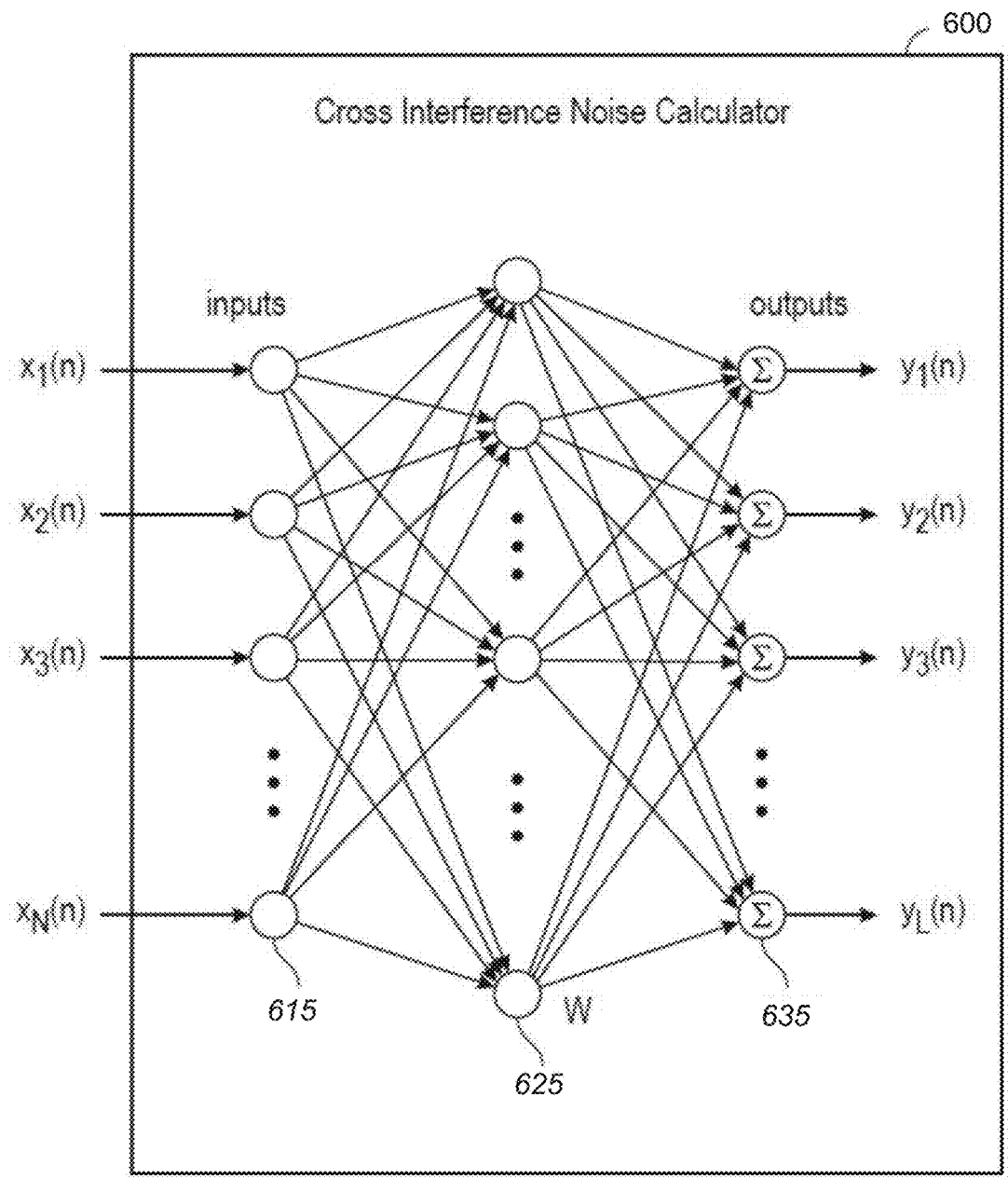
FIG. 6 is a schematic illustration of an example self-interference noise calculator arranged in accordance with embodiments of the disclosure.

FIG. 6 is a schematic illustration of an example self-interference noise calculator 600 arranged in accordance with embodiments of the disclosure. The self-interference noise calculator 600 may be utilized to implement the self-interference noise calculator 340 of FIG. 3, for example. The self-interference noise calculator 600 includes a network of processing elements 615, 625, 635 that output adjusted signals $y_1(n)$, $y_2(n)$, $y_3(n)$, $y_L(n)$ on the basis of transmitter output data $x_1(n)$, $x_2(n)$, $x_3(n)$, $x_N(n)$. For example, the transmitter output data $x_1(n)$, $x_2(n)$, $x_3(n)$, $x_N(n)$ may correspond to inputs for respective antennas of each transmitter generating the respective $x_1(n)$, $x_2(n)$, $x_3(n)$, $x_N(n)$. The processing elements 615 receive the transmitter output data $x_1(n)$, $x_2(n)$, $x_3(n)$, $x_N(n)$ as inputs. The processing elements 615 may be implemented, for example, using bit manipulation units that may forward the transmitter output data $x_1(n)$, $x_2(n)$, $x_3(n)$, $x_N(n)$ to processing elements 625. Processing elements 625 may be implemented, for example, using multiplication units that include a non-linear vector set (e.g., center vectors) based on a non-linear function, such as a Gaussian function (e.g.:

$$f(r) = \exp\left(-\frac{r^2}{\sigma^2}\right),$$

a multi-quadratic function (e.g., $f(r)=(r^2+\sigma^2)$), an inverse multi-quadratic function (e.g., $f(r)=(r^2+\sigma^2)$), a thin-plate spine function (e.g., $f(r)=r^2 \log(r)$), a piece-wise linear function (e.g., $f(r)=½(|r+1|-r-1|)$, or a cubic approximation function e.g., $f(r)=½(|r^3+1|-|r^3-1|))$. In some examples, the parameter a is a real parameter (e.g., a scaling parameter) and r is the distance between the input signal (e.g., $x_1(n)$, $x_2(n)$, $x_3(n)$, $x_N(n)$) and a vector of the non-linear vector set. Processing elements 635 may be implemented, for example, using accumulation units that sum the intermediate processing results received from each of the processing elements 625. In communicating the intermediate processing results, each intermediate processing result may be weighted with a weight 'W'. For example, the multiplication processing units may weigh the intermediate processing results based on a minimized error for the all or some of the adjustment signals that may generated by a self-interference noise calculator.

The processing elements 625 include a non-linear vector set may be denoted as $C_i$ (for i=1, 2, ... H). H may represent the number of processing elements 625. With the transmitter output data $x_1(n)$, $x_2(n)$, $x_3(n)$, $x_N(n)$ received as inputs to processing elements 625, after forwarding by processing elements 615, the output of the processing elements 625, operating as multiplication processing units, may be expressed as $h_i(n)$, such that:

$$h_i(n)=f_i(\|X(n)-c_i\|) \ (i=1,2,\ldots,H) \quad (3)$$

$f_i$ may represent a non-linear function that is applied to the magnitude of the difference between $x_1(n)$, $x_2(n)$, $x_3(n)$, $x_N(n)$ and the center vectors $C_i$. The output $h_i(n)$ may represent a non-linear function such as a Gaussian function, multi-quadratic function, an inverse multi-quadratic function, a thin-plate spine function, or a cubic approximation function.

The output $h_i(n)$ of the processing elements 625 may be weighted with a weight matrix 'W'. The output $h_i(n)$ of the processing elements 625 can be referred to as intermediate processing results of the self-interference noise calculator 600. For example, the connection between the processing elements 625 and processing elements 635 may be a linear function such that the summation of a weighted output $h_i(n)$ such that the adjusted signals $y_1(n)$, $y_2(n)$, $y_3(n)$, $y_L(n)$ may be expressed, in Equation 4 as:

$$y_i(n) = \sum_{j=1}^{H} W_{ij} h_j(n) = \sum_{j=a}^{H} W_{ij} f_j(\|X(n)-c_j\|) \ (i=1, 2, \ldots, L) \quad (4)$$

Accordingly, the adjusted signals $y_1(n)$, $y_2(n)$, $y_3(n)$, $y_L(n)$ 530 may be the output $y_i(n)$ of the i'th processing element 635 at time n, where L is the number of processing elements 635. $W_{ij}$ is the connection weight between j'th processing element 625 and i'th processing element 635 in the output layer. The center vectors $C_i$ and the connection weights of each layer of processing elements may be determined by a training unit that utilizes sample vectors to train the self-interference noise calculator 600. Advantageously, the adjusted signals $y_1(n)$, $y_2(n)$, $y_3(n)$, $y_L(n)$ generated from the transmitter output data $x_1(n)$, $x_2(n)$, $x_3(n)$, $x_N(n)$ may be computed with near-zero latency such that self-interference compensation may be achieved in any electronic device including a self-interference noise calculator, such as the self-interference noise calculator 600. A wireless device or system that implements a self-interference noise calculator 600 may achieve full duplex transmission. For example, the adjusted signals generated by the self-interference noise calculator 600 may compensate-interference that an antenna of the wireless device or system will experience due to signals to be transmitted by another antenna of the wireless device or system.

While the self-interference noise calculator 600 has been described with respect to a single layer of processing elements 625 that include multiplication units, it can be appreciated that additional layers of processing elements with multiplication units may be added between the processing elements 615 and the processing elements 635. The self-interference noise calculator is scalable in hardware form, with additional multiplication units being added to accommodate additional layers. Using the methods and systems described herein, additional layer(s) of processing elements including multiplication processing units and the processing elements 625 may be optimized to determine the center vectors $C_i$ and the connection weights $W_{ij}$ of each layer of processing elements including multiplication units.

The self-interference noise calculator 600 can be implemented using one or more processors, for example, having any number of cores. An example processor core can include an arithmetic logic unit (ALU), a bit manipulation unit, a multiplication unit, an accumulation unit, an adder unit, a look-up table unit, a memory look-up unit, or any combination thereof. In some examples, the self-interference noise calculator 600 may include circuitry, including custom circuitry, and/or firmware for performing functions described herein. For example, circuitry can include multiplication unit, accumulation units, and/or bit manipulation units for performing the described functions, as described herein. The self-interference noise calculator 600 may be implemented in any type of processor architecture including but not limited to a microprocessor or a digital signal processor (DSP), or any combination thereof.

Figure 7:
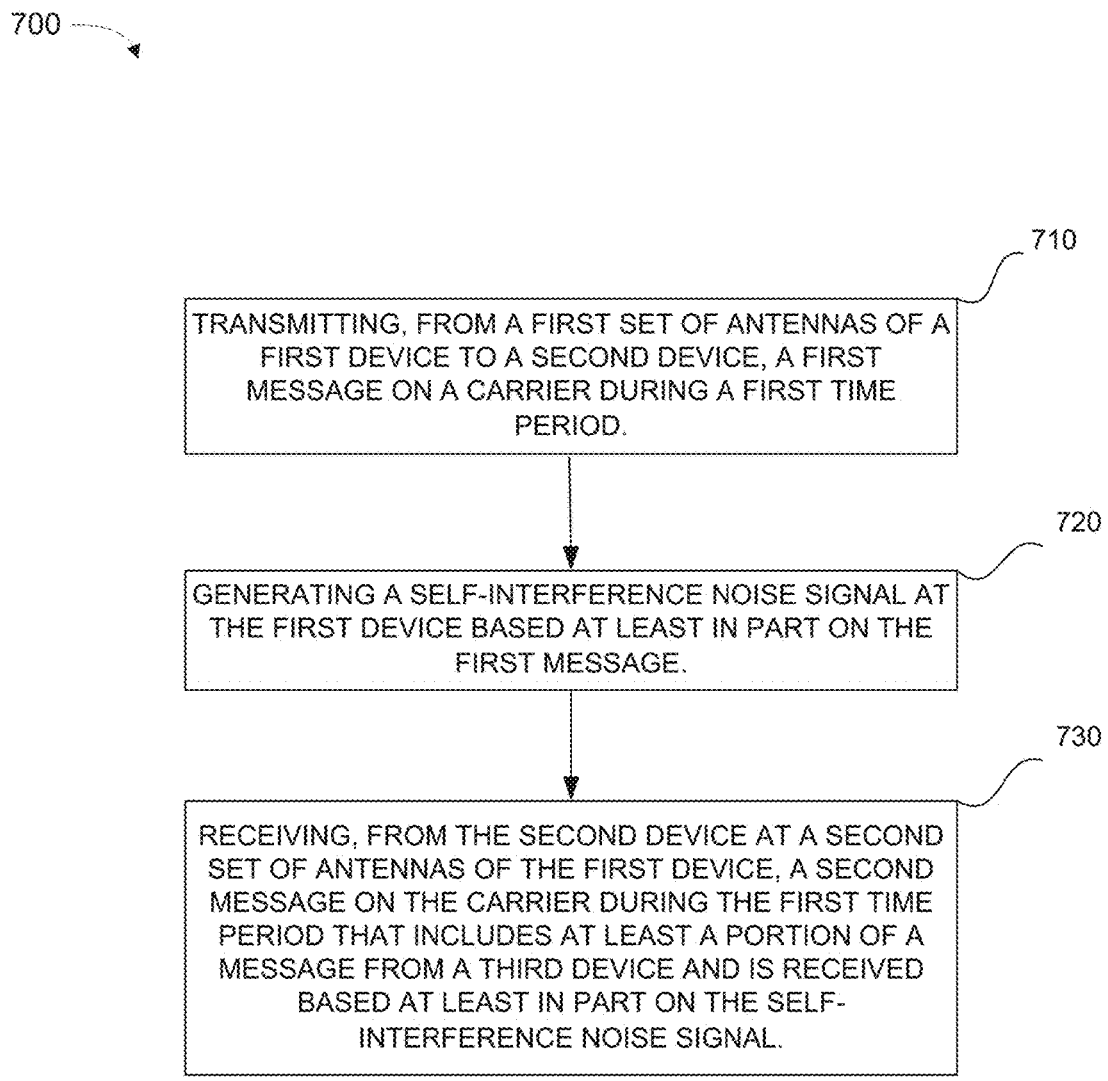
FIG. 7 is a schematic illustration of a method to implement full duplex communication in device to device cooperative wireless communication in accordance with embodiments of the disclosure.

FIG. 7 is a schematic illustration of a method 700 to implement full duplex communication in device to device cooperative wireless communication in accordance with embodiments of the disclosure. The method 700 may be implemented using any of the base station 110, the electronic devices 120(0)-120(3), or the electronic device 130 of FIG. 1, the base station 210, the electronic devices 220(0)-220(3), or the electronic device 230 of FIG. 2, or the electronic device 310 of FIG. 3, or any system or combination of the systems depicted in FIGS. 1-3 described herein. The operations described in steps 710-730 may also be stored as computer-executable instructions in a computer-readable medium.

The method 700 may include transmitting, from a first set of antennas of a first device to a second device, a first message on a carrier during a first time period, at 710. The first device may include the electronic device 130 of FIG. 1, the electronic device 230 of FIG. 2, or the electronic device 310 of FIG. 3, The first message may be transmitted by a wireless transmitter and antenna pair such as the wireless transmitter 311/antenna 301 pair or the wireless transmitter 313/antenna 303 pairs of FIG. 3. Transmission of the first message may include transmitting the first message on a sidelink to the second device.

The first device may include the electronic device 130 of FIG. 1, the electronic device 230 of FIG. 2, or the electronic device 310 of FIG. 3.

The method 700 may further include generating a self-interference noise signal at the first device based at least in part on the first message, at 720. The self-interference noise signal may be generated by a self-interference noise calculator, such as the self-interference noise calculator 340 of FIG. 3 or the self-interference noise calculator 600 of FIG. 6. The application of the self-interference noise signal may be performed by a compensation component, such as one of the compensation components 345, 347 of FIG. 3. In some examples, the second message is received from a second relay device, or it may be received from the same relay device to which the first message is transmitted.

The method 700 may further include receiving, from the second device at a second set of antennas of the first device, a second message on the carrier during the first time period, at 730. The second message may include at least a portion of a message from a third device and is received based at least in part on the self-interference noise signal. The second device may include the electronic devices 120(0)-(3) of FIG. 1, the electronic devices 220(0)-(3) of FIG. 2, or the electronic device 310 of FIG. 3. Specifically, the second message may be received by a wireless receiver and antenna pair such as the wireless receiver 315/antenna 305 pair or the wireless receiver 317/antenna 307 pairs of FIG. 3. In some examples, the first device includes first user equipment (UE) and the second device includes second HE, the first UE and the second UE may be included in a same category of UE. In some examples, the second device comprises a relay node. Receipt of the second message may include receiving the second message on the sidelink from the second device.

In some examples, the method 700 may further include receiving a third message on the carrier during a second time period that is before the first time period, wherein the first message is transmitted in response to the third message. In this example, the first message may include an acknowledgement (ACK) or a negative acknowledgment (HACK) for the third message. In some examples, the third device includes a third UE. In other examples, at least one of the second device or the third device comprises a base station, such as the base station 110 of FIG. 1. In some examples, the first device, the second device, and/or the third device are configured to implement one of a generalized selection combining protocol, a distributed space-time coding protocol, or an opportunistic relaying system protocol.

In some examples the method 700 may further receive a second receive signal. The method 700 may further include generating a second self-interference noise signal based on the first message, and applying the second self-interference noise signal to the second receive signal to filter out interference caused by transmission of the first message to provide a third message. The method 700 may further include combining the second message and third message to form a whole message (e.g., such as described in FIGS. 2B and/or 2C). For example, the first received signal may be received during a first portion of the time slot and the second receive signal may be received during a second portion of the time slot. In some examples, the first portion of the time slot is non-overlapping with the second portion of the time slot, as in shown in FIG. 2B.

The steps 710-740 included in the described example method 700 are for illustration purposes. In some embodiments, these steps may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 8:
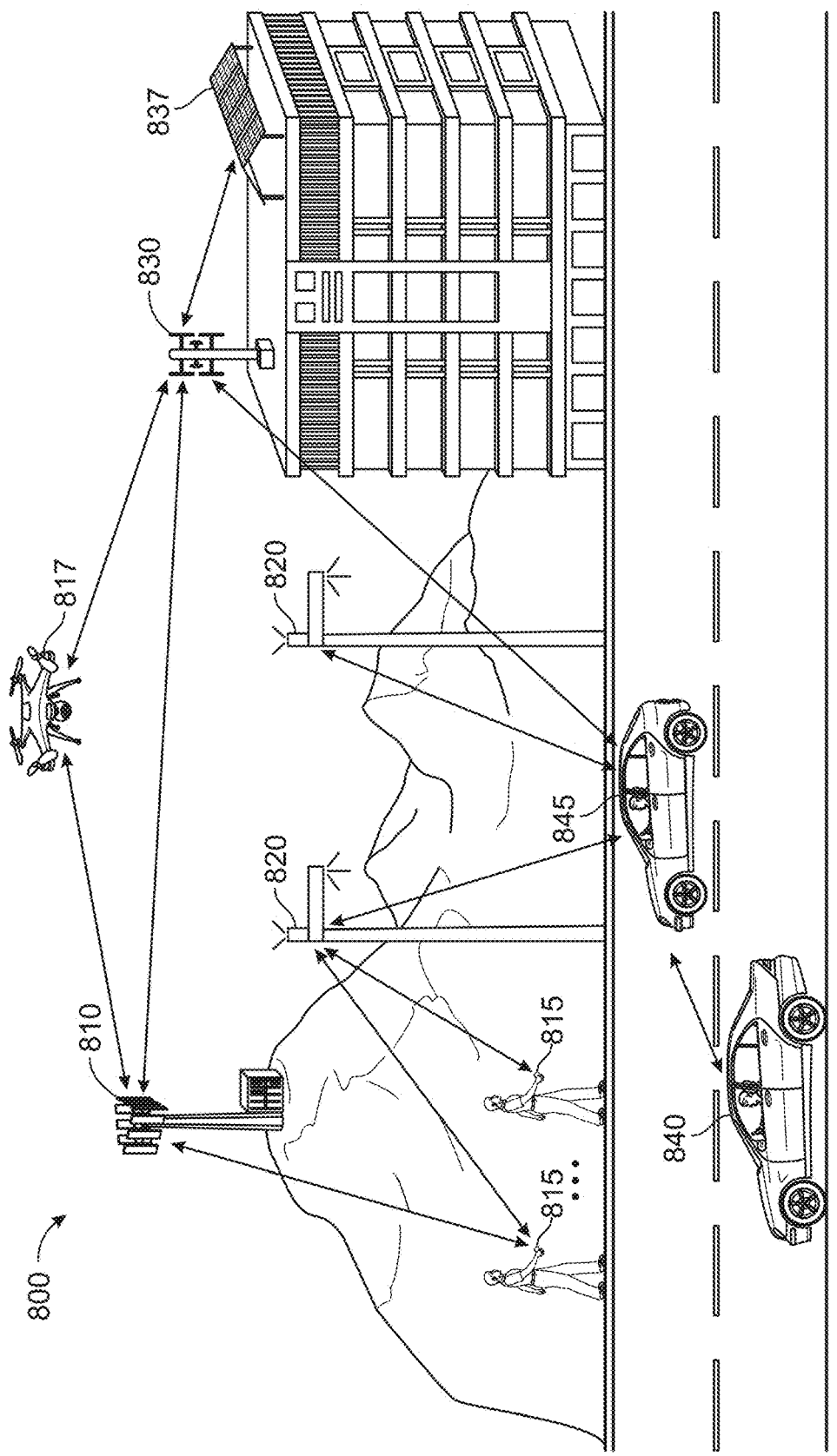
FIG. 8 is a schematic illustration of an example of a wireless communications system in accordance with aspects of the present disclosure.

FIG. 8 illustrates an example of a wireless communications system 800 in accordance with aspects of the present disclosure. The wireless communications system 800 includes a base station 810, a mobile device 815, a drone 817, a small cell 830, and vehicles 840, 845. The base station 810 and small cell 830 may be connected to a network that provides access to the Internet and traditional communication links. The base station 810 and/or small cell 830 may be implemented using base stations described herein, such as base station 110 of FIG. 1, base station 210 of FIG. 2, and/or electronic device 310 of FIG. 3. The base station 810, small cell 830, mobile device 815, drone 817, and/or vehicles 840, 845 may incorporate a transmitter and/or receiver described herein, such as the wireless transmitter 400 of FIG. 4 and/or receiver 500 of FIG. 5. The mobile device 815, drone 817, and/or vehicles 840, 845 may be implemented using mobile devices described herein, such as electronic devices 120(0)-120(3) and/or electronic device 130 of FIG. 1, electronic devices 220(0)-220(3) and/or electronic device 230 of FIG. 2, and/or electronic device 310 of FIG. 3. The base station 810, small cell 830, mobile device 815, drone 817, and/or vehicles 840, 845 may utilize self-interference cancellation techniques described herein. The devices and/or base stations of FIG. 8 may further utilize full-duplex communication as described herein, where the devices and/or base stations are capable of contemporaneously transmitting signals to another device or base station and receiving signals from another device or base station.

The base station 810, small cell 830, mobile device 815, drone 817, and/or vehicles 840, 845 may further utilize protocols described herein to relay signals while using full-duplex communication. For example, signals to and from the vehicle 840 may be relayed between one or both of the communication devices 820 or the small cell 830 via the vehicle 845. In another example, signals to and from the vehicle 845 may be relayed between one or both of the mobile device 815 via the communication device 820. In another example, signals to and from the small cell 830 may be relayed to the base station 810 via the drone 817. In some examples, signals to and from the vehicles 840, 845 may be relayed to the base station 810 or the small cell 830 via the drone 817. The drone 817 may move to follow traffic to help with communication congestion during high volume traffic.

The system 800 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) or other technical specification published by an organization like 3GPP or IEEE, which may include various specifications for subcarrier frequency ranges, a number of subcarriers, sidelink/uplink/downlink transmission speeds, TDD/FDD, and/or other aspects of wireless communication protocols.

The system 800 may depict aspects of a radio access network (RAN), and system 800 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 810, communication devices 820, and small cells 830 may be coupled with the core network or with one another, or both, via wired or wireless backhaul links (e.g., S1 interface, X2 interface, etc.).

The system 800 may provide communication links connected to devices or "things," such as sensor devices, e.g., solar cells 837, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 1, 5, 10, or 20 MHz, for example.

Additionally or alternatively, the IoT may include devices or things operating at different frequencies than traditional cellular technology to facilitate use of the wireless spectrum. For example, an IoT framework may allow multiple devices in system 800 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 837, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment.

In such a 5G framework, devices may perform functionalities performed by base stations in other mobile networks (e.g., UMTS or LTE), such as forming a connection or managing mobility operations between nodes (e.g., handoff or reselection). For example, mobile device 815 may receive sensor data from the user utilizing the mobile device 815, such as blood pressure data, and may transmit that sensor data on a narrowband IoT frequency band to base station 810. In such an example, some parameters for the determination by the mobile device 815 may include availability of licensed spectrum, availability of unlicensed spectrum, and/or time-sensitive nature of sensor data. Continuing in the example, mobile device 815 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 815 may form device-to-device (D2D) connections with other mobile devices or other elements of the system 800. For example, the mobile device 815 may form REID WiFi, MultiFire, Bluetooth, or Zigbee connections with other devices, including communication device 820 or vehicle 845. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 815 to provide information (e.g., sensor data) collected on different frequency bands than a frequency band determined by mobile device 815 for transmission of that information.

Moreover, some communication devices may facilitate ad-hoc networks, for example, a network being formed with communication devices 820 attached to stationary objects (e.g., lampposts in FIG. 8) and the vehicles 840, 845, without a traditional connection to a base station 810 and/or a core network necessarily being formed. Other stationary objects may be used to support communication devices 820, such as, but not limited to, trees, plants, posts, buildings, blimps, dirigibles, balloons, street signs, mailboxes, or combinations thereof. In such a system 800, communication devices 820 and small cell 830 (e.g., a picocell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 815 communicating with base station 810 on a cellular communication band.

The communication devices 820 may form wireless networks, operating in either a hierarchal or ad-hoc network fashion, depending, in part, on the connection to another element of the system 800. For example, the communication devices 820 may utilize a 700 MHz communication frequency to form a connection with the mobile device 815 in an unlicensed spectrum, while utilizing a licensed spectrum communication frequency to form another connection with the vehicle 845. Communication devices 820 may communicate with vehicle 845 on a licensed spectrum to provide direct access for time-sensitive data, for example, data for an autonomous driving capability of the vehicle 845 on a 5.9 GHz band of Dedicated Short Range Communications (DSRC).

Vehicles 840 and 845 may form an ad-hoc network at a different frequency band than the connection between the communication device 820 and the vehicle 845. For example, for a high bandwidth connection to provide time-sensitive data between vehicles 840, 845, a 24 GHz mmWave band may be utilized for transmissions of data between vehicles 840, 845. For example, vehicles 840, 845 may share real-time directional and navigation data with each other over the connection while the vehicles 840, 845 pass each other across a narrow intersection line. Each vehicle 840, 845 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 820 and the vehicle 845, for example, for processing of image data received at both vehicle 845 and vehicle 840, as transmitted by the vehicle 840 to vehicle 845 over the 24 GHz mmWave band. While shown as automobiles in FIG. 8, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 2.4 GHz mmWave band, it can be appreciated that connections may be formed in the system 800 in other mmWave bands or other frequency bands, such as 28 GHz, 37 GHz, 38 GHz, 39 GHz, which may be licensed or unlicensed bands. In some cases, vehicles 840, 845 may share the frequency band that they are communicating on with other vehicles in a different network. For example, a fleet of vehicles may pass vehicle 840 and, temporarily, share the 24 GHz mmWave band to form connections among that fleet, in addition to the 24 GHz mmWave connection between vehicles 840, 845. As another example, communication device 820 may substantially simultaneously maintain a 700 MHz connection with the mobile device 815 operated by a user (e.g., a pedestrian walking along the street) to provide information regarding a location of the user to the vehicle 845 over the 5.9 GHz band. In providing such information, communication device 820 may leverage antenna diversity schemes as part of a massive MIMO framework to facilitate time-sensitive, separate connections with both the mobile device 815 and the vehicle 845. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 810 and small cell 830 may wirelessly communicate with devices in the system 800 or other communication-capable devices in the system 800 having at the least a sensor wireless network, such as solar cells 837 that may operate on an active/sleep cycle, and/or one or more other sensor devices. The base station 810 may provide wireless communications coverage for devices that enter its coverages area, such as the mobile device 815 and the drone 817. The small cell 830 may provide wireless communications coverage for devices that enter its coverage area, such as near the building that the small cell 830 is mounted upon, such as vehicle 845 and drone 817.

Generally, a small cell 830 may be referred to as a picocell and provide coverage for a local geographic region, for example, coverage of 200 meters or less in some examples. This may be contrasted with at macrocell, which may provide coverage over a wide or large area on the order of several square miles or kilometers. In some examples, a small cell 830 may be deployed (e.g., mounted on a building) within some coverage areas of a base station 810 (e.g., a macrocell) where wireless communications traffic may be dense according to a traffic analysis of that coverage area. For example, a small cell 830 may be deployed on the building in FIG. 8 in the coverage area of the base station 810 if the base station 810 generally receives and/or transmits a higher amount of wireless communication transmissions than other coverage areas of that base station 810. A base station 810 may be deployed in a geographic area to provide wireless coverage for portions of that geographic area. As wireless communications traffic becomes more dense, additional base stations 810 may be deployed in certain areas, which may alter the coverage area of an existing base station 810, or other support stations may be deployed, such as a small cell 830. Small cell 830 may be a femtocell, which may provide coverage for an area smaller than a picocell (e.g., 100 meters or less in some examples (e.g., one story of a building)).

While base station 810 and small cell 830 may provide communication coverage for a portion of the geographical area surrounding their respective areas, both may change aspects of their coverage to facilitate faster wireless connections for certain devices. For example, the small cell 830 may primarily provide coverage for devices surrounding or in the building upon which the small cell 830 is mounted. However, the small cell 830 may also detect that a device has entered is coverage area and adjust its coverage area to facilitate a faster connection to that device.

For example, a small cell 830 may support a massive MIMO connection with the drone 817, which may also be referred to as an unmanned aerial vehicle (UAV), and, when the vehicle 845 enters it coverage area, the small cell 830 adjusts some antennas to point directionally in a direction of the vehicle 845, rather than the drone 817, to facilitate a massive MIMO connection with the vehicle, in addition to the drone 817. In adjusting some of the antennas, the small cell 830 may not support as fast as a connection to the drone 817, as it had before the adjustment. However, the drone 817 may also request a connection with another device (e.g., base station 810) in its coverage area that may facilitate a similar connection as described with reference to the small cell 830, or a different (e.g., faster, more reliable) connection with the base station 810. Accordingly, the system 800 may enhance existing communication links in providing additional connections to devices that may utilize or demand such links. For example, the small cell 830 may include a massive MIMO system that directionally augments a link to vehicle 845, with antennas of the small cell directed to the vehicle 845 for a specific time period, rather than facilitating other connections (e.g., the small cell 830 connections to the base station 810, drone 817, or solar cells 837). In some examples, drone 817 may serve as a movable or aerial base station.

The wireless communications system 800 may include devices such as base station 810, communication device 820, and small cell 830 that may support several connections to devices in the system 800. Such devices may operate in a hierarchal mode or an ad-hoc mode with other devices in the network of system 800. While described in the context of a base station 810, communication device 820, and small cell 830, it can be appreciated that other devices that can support several connections with devices in the network may be included in system 800, including but not limited to: macrocells, femtocells, routers, satellites, and RFID detectors.

Certain details are set forth above to provide a sufficient understanding of described embodiments. However, it will be clear to one skilled in the art that embodiments may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UNITS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
    transmitting, from a first set of antennas of a first device to a second device and a third device, a first message on a carrier during a first time period;
    generating a self-interference noise signal at the first device based at least in part on the first message;
    receiving, from the second device at a second set of antennas of the first device, a first part of a second message on the carrier during a first portion of the first time period, wherein the first part of the second message comprises a first part of a message from a fourth device and the first part of the second message is received based at least in part on the self-interference noise signal; and
    receiving, from the third device at the second set of antennas of the first device, a second part of the second message on the carrier during a second portion of the first time period, wherein the second part of the second message comprises a second part of the message from the fourth device and is received based at least in part on the self-interference noise signal.

2. The method of claim 1, further comprising receiving a third message on the carrier during a second time period that is before the first time period, wherein the first message is transmitted in response to the third message.

3. The method of claim 2, wherein the first message comprises an acknowledgement (ACK) or a negative acknowledgment (NACK) for the third message.

4. The method of claim 1, wherein transmitting the first message comprises transmitting the first message on a sidelink to the second device.

5. The method of claim 1, wherein receiving second message comprises receiving the second message on a sidelink from the second device.

6. The method of claim 1, wherein the first device comprises first user equipment (UE), the second device comprises second UE, and the third device comprises third UE.

7. The method of claim 6, wherein the first UE, the second UE, and the third UE comprise a same category of UE.

8. The method of claim 6, wherein the fourth device comprises a third UE.

9. The method of claim 1, wherein the third device comprises a base station.

10. The method of claim 1, wherein the second device and the third device each comprise a respective relay node.

* * * * *